United States Patent [19]

Hira et al.

[11] 4,145,369
[45] Mar. 20, 1979

[54] FLAME-RETARDANT EPOXY RESIN COMPOSITIONS

[75] Inventors: Yasuo Hira, Fujisawa; Ryoichi Sudo, Yokosuka; Issei Takemoto, Yokohama; Tokio Isogai, Hitachi, all of Japan

[73] Assignee: Hitachi, Ltd., Japan

[21] Appl. No.: 834,457

[22] Filed: Sep. 19, 1977

[30] Foreign Application Priority Data

Sep. 20, 1976 [JP] Japan ................................ 51/111870
Sep. 2, 1977 [JP] Japan ................................ 52/104958

[51] Int. Cl.$^2$ ............................................ C08L 63/00
[52] U.S. Cl. .................... 260/831; 260/829; 260/834; 528/89
[58] Field of Search ............... 260/831, 45.7 DE, 834, 260/829; 528/89

[56] References Cited

U.S. PATENT DOCUMENTS

| | | | |
|---|---|---|---|
| 3,373,135 | 3/1968 | Jenkner | 260/45.7 PE |
| 3,477,982 | 11/1969 | Dijkstra | 260/45.7 PE |
| 3,563,850 | 2/1971 | Stackhouse | 260/831 |
| 3,660,321 | 5/1972 | Praetzel | 260/45.7 PE |
| 3,780,132 | 12/1973 | Lohr | 260/831 |
| 3,823,200 | 7/1974 | Pradenne | 260/831 |
| 3,867,344 | 2/1975 | Frank | 260/831 |
| 3,906,055 | 9/1975 | Fishman | 260/831 |
| 3,922,459 | 11/1975 | Franz | 260/831 |
| 3,936,342 | 2/1976 | Matsubara | 260/831 |

*Primary Examiner*—Paul Lieberman
*Attorney, Agent, or Firm*—Craig & Antonelli

[57] ABSTRACT

Flame-retardant epoxy resin compositions comprising a polyepoxide, an acid anhydride curing agent, an imidazole curing accelerator, aluminum trihydrate powder and red phosphorus powder or red phosphorus powder coated by a thermo-setting resin have a lower viscosity and therefore show a longer pot life and better workability on casting as compared with prior art resin compositions. Also, a fly-back transformer coil produced by casting of said flame-retardant epoxy resin compositions is flame-retardant. Even if it burns slightly, no toxic gas is produced. Therefore, the coil has advantages in that a magnet wire is not corroded and voids are difficult to be formed and thereby partial discharge is difficult to occur, resulting in a long life and a stable output voltage.

22 Claims, 4 Drawing Figures

FLAME-RETARDANT EPOXY RESIN COMPOSITIONS

LIST OF PRIOR ART (37 CFR 1.56(a))

The following references are cited to show the state of the art:
Japanese Patent Kokoku (Post-Exam. Publn.) No. 28,510/70
Japanese Patent Kokai (Laid-Open) No. 105,996/76
Japanese Patent Kokoku (Post-Exam. Publn.) No. 44,040/76

The present invention relates to flame-retardant epoxy resin compositions used in the casting of a fly-back transformer for a television receiver.

A fly-back transformer is produced by the casting of a flame-retardant epoxy resin composition. In the insulation treatment of the fly-back transformer, an epoxy resin flame retarded with a flame retardant such as antimony trioxide or a halogenated organic compound is used. However, the halogenated organic compound generates harmful hydrogen halides on burning and the antimony trioxide is harmful to human beings. Therefore, epoxy resin compositions flame retarded with these flame retardants give rise to trouble on handling or disposal.

On the other hand, as the flame-retardant epoxy resin compositions, there are known (1) a composition comprising a polyepoxide containing more than one epoxy group in its molecule, an acid anhydride curing agent and red phosphorus powder, (2) a composition wherein red phosphorus powder in the above-mentioned composition (1) is replaced by resin-coated red phosphorus powder and (3) a composition comprising a polyepoxide, an amine curing agent, red phosphorus powder and aluminium trihydrate. The said composition (1) comprising 2 to 25 parts by weight of red phosphorus powder per 100 parts by weight of a polyepoxide has a defect in that the red phosphorus ignites on kneading and there is a danger of fire or explosion. Further, a fly-back transformer produced by the casting of the said epoxy resin composition thus flame retarded with red phosphorus only shows inferior flame retardancy in a flame retardancy test of fly-back transformer (Electric Appliance Control Regulation in Japan). This respect may be improved by increasing the amount of the red phosphorus added. However, the increase in the amount of red phosphorus added results in an increase in the viscosity of the flame-retardant epoxy resin composition, deterioration of casting workability and high expenses.

In the said composition (2) using resin-coated red phosphorus, there is no danger of the ignition of red phosphorus on kneading. However, the other defects of the composition (1) are not yet obviated.

The said composition (3) improves flame retardant effect by the use of a combination of red phosphorus powder and aluminum trihydrate powder as compared with the use of red phosphorus powder alone or aluminium trihydrate alone. Therefore, the amount of red phosphorus can be decreased and thereby ignition on kneading is not brought about. Also, there occurs no sedimentation of red phosphorus in contrast with the flame-retardant epoxy resin composition using red phosphorus powder alone. Thus, the defects of the compositions (1) and (2) are obviated in the composition (3).

However, the composition (3) is still unsatisfactory in flame retardancy (Electric Appliance Control Regulation in Japan) and unpractical when applied to the casting of a fly-back transformer.

This respect may be improved by increasing the amount of red phosphorus and aluminum trihydrate added. However, the increase in the amount added has defects in that the initial viscosity of the resin composition increases, fine gaps in the coil portion of the fly-back transformer are not impregnated, and the pot life of the composition decreases.

Therefore, an object of the present invention is to provide a flame-retardant epoxy resin composition which has obviated the above-mentioned defects of prior art flame-retardant epoxy resin compositions. Another object of the invention is to provide a flame-retardant epoxy resin composition which has a long pot life and such a low viscosity that fine gaps in the coil portion of a fly-back transformer can be impregnated.

As a result of various studies on flame-retardant epoxy resin compositions to achieve the above-mentioned objects, it has now been found that flame-retardant epoxy resin compositions comprising a polyepoxide, an acid anhydride curing agent, an imidazole curing accelerator, red phosphorus powder and aluminum trihydrate powder, and preferably comprising a polyepoxide, an acid anhydride curing agent, an imidazole curing agent, red phosphorus powder coated by a thermo-setting resin and aluminum trihydrate powder, are preferable. More particularly, a flame-retardant epoxy resin composition comprising a polyepoxide, an acid anhydride curing agent, an imidazole curing accelerator, red phosphorus powder and aluminum trihydride powder is characterized by its lower initial viscosity and its longer pot life (a slower increase in the viscosity of the composition when allowed to stand) as compared with epoxy resin compositions comprising a polyepoxide, an amine curing agent, red phosphorus powder and aluminum trihydrate powder. Further, a flame-retardant epoxy resin composition comprising a polyepoxide, an acid anhydride curing agent, an imidazole curing accelerator, red phosphorus powder coated by a thermo-setting resin and aluminum trihydrate powder shows a lower initial viscosity and a longer pot life as compared with a flame-retardant epoxy resin composition comprising a polyepoxide, an acid anhydride curing agent, an imidazole curing accelerator, red phosphorus powder and aluminum trihydrate powder even if the amount of red phosphorus powder coated by a thermosetting resin and aluminum trihydrate powder in the former composition is identical with the amount of red phosphorus powder and aluminum trihydrate powder in the latter composition. The present invention has been completed based on these findings.

According to the present invention, there is provided a flame-retardant epoxy resin composition comprising 100 parts by weight of a polyepoxide containing more than one epoxy group in its molecule, 0.8 to 1.2 equivalents of an acid anhydride curing agent per equivalent of the polyepoxide, 0.5 to 5 parts by weight of an imidazole curing agent per 100 parts by weight of said polyepoxide, and amounts of aluminum trihydrate powder and at least one member selected from the group consisting of red phosphorus powder and red phosphorus powder coated by a thermosetting resin within the range surrounded by connecting the points A, B, C, D, E, F, G, H and I as described below per 100 parts by weight of said polyepoxide, wherein the points A, B, C, D, E, F, G, H and I each represent the following compositions:

|   | Aluminum trihydrate powder (parts by weight) | Red phosphorus powder or red phosphorus powder coated by a thermo-setting resin (parts by weight) |
|---|---|---|
| A | 72  | 50 |
| B | 83  | 20 |
| C | 103 | 10 |
| D | 160 | 5  |
| E | 220 | 4  |
| F | 198 | 20 |
| G | 178 | 31 |
| H | 154 | 40 |
| I | 112 | 46 |

The raw materials used in the present invention will be explained.

The polyepoxide is preferably in liquid state at 25° C. in view of the efficiency of the casting operation of the fly-back transformer. As the polyepoxide, for example, bisphenol A diglycidyl ether, bisphenol F diglycidyl ether, polyglycidyl esters of a polycarboxylic acid such as phthalic acid, terephthalic acid, tetrahydrophthalic acid or hexahydrophthalic acid and polyepoxides obtained by epoxidation of a cyclohexane derivative such as bis(3,4-epoxy-6-methylcyclohexylmethyl) adipate may be used. Here, the above-mentioned polyepoxides may be used alone or in admixture. Also, if necessary, a liquid monoepoxide such as butyl glycidyl ether or phenyl glycidyl ether may be added thereto to reduce their viscosity.

The acid anhydride curing agent is also preferably in liquid state at room temperature. As the acid anhydride curing agent, methyltetrahydrophthalic anhydride, methylendomethylenetetrahydrophthalic anhydride and modified hexahydrophthalic anhydrides such as a eutectic mixture of hexahydrophthalic anhydride and phthalic anhydride may be used.

As a curing accelerator usable when an acid anhydride curing agent is used, imidazole compounds, tertiary amine compounds such as tris(dimethylaminomethylphenol) or benzyldimethylamine, ferrocene derivatives, boron trifluoride compounds and piperazine derivatives may be used, but imidazole compounds are most preferable among these compounds. The reasons therefor are that they give a long pot life (a small change in viscosity with the lapse of time) when mixed with an acid anhydride, that an epoxy resin composition having excellent thermal resistance can be obtained even if a curing temperature is 120° C. or less, and that their adhesiveness with a magnet wire (a polyurethane layer) used in a fly-back transformer is good and the layer is not changed in quality.

Here, as the imidazole compounds, 2-ethyl-4-methylimidazole, 2-phenylimidazole, 2-methylimidazole, 1-benzyl-2-methylimidazole, 1,2-dimethylimidazole, etc. may be used.

The average particle size of aluminum trihydrate powder is 1 to 20μ, and preferably 5 to 15μ. The average particle size of red phosphorus powder or red phosphorus powder coated by a thermo-setting resin is 4 to 20μ, and preferably 5 to 15μ. If the average particle size of aluminum trihydrate powder is less than 1μ and that of red phosphorus powder or red phosphorus powder coated by a thermo-setting resin is less than 4μ, the viscosity of the resulting resin composition becomes unpractically high. If the average particle size of aluminum trihydrate and that of red phosphorus powder or red phosphorus powder coated by a thermo-setting resin are respectively more than 20μ, remarkable sedimentation of aluminum trihydrate powder or red phosphorus powder or red phosphorus powder coated by a thermo-setting resin in the resin composition makes the resin composition unpractical.

As for the amount of aluminum trihydrate powder used and the amount of at least one member selected from the group consisting of red phosphorus powder and red phosphorus powder coated by a thermosetting resin used, in an epoxy varnish comprising 100 parts by weight of an epoxy resin, an acid anhydride and a curing accelerator, a preferable mixing ratio is preferably within the range surrounded by the points A, B, C, D, E, F, G, H and I in FIG. 1 per 100 parts by weight of a polyepoxide. If a fly-back transformer is produced by the casting of a flame-retardant epoxy resin composition having a composition outside this range, the fly-back transformer thus obtained has unsatisfactory flame retardancy. Also, there is the possibility that the inside of the secondary coil of the fly-back transformer is not satisfactorily impregnated with said epoxy varnish, and voids are easy to be formed.

Also, the viscosity of a flame-retardant epoxy resin composition having a composition within the above-mentioned range is 2 to 70 poise at 25° C. If the viscosity is lower than 2 poise, the flame retardancy of the resulting fly-back transformer is unsatisfactory. Also, if the viscosity is higher than 70 poise, an unsatisfactorily impregnated fly-back transformer is produced.

The red phosphorus powder used in the present invention may be untreated one, but is preferably one coated by a thermo-setting resin.

As the resin composition for surface coating, a water-dispersible one is preferable in view of the efficiency of surface coating of red phosphorus powder, and a heat-resistant one is preferable and a one having excellent wettability for the epoxy resin composition is preferable in view of the physical properties of the resulting flame-retardant epoxy resin composition. Thus, phenol resin is most suitable.

When a fly-back transformer is produced by the casting of the above-mentioned flame-retardant epoxy resin composition, the following effects can be obtained:

(a) Since fine gaps in the coil portion of the fly-back transformer can be impregnated with the resin, partial discharge is difficult to occur and the life of the transformer becomes long.

(b) The flame-retardancy of the fly-back transformer does not cause trouble in its practical use (Electric Appliance Control Regulation in Japan).

(c) A magnet wire and electrodes are not corroded.

(d) Harmful gases or smoke is difficult to be produced even if the fly-back transformer is damaged.

(e) The fly-back transformer shows a stable output voltage. Thus, even if the fly-back transformer is allowed to stand at a high temperature and a high humidity, a change in high voltage regulation characteristics (a change in output voltage with a change in beam current) is small. This is caused by the change rate of dielectric properties of flame-retardant epoxy resin compositions according to the present invention.

(f) Even if the fly-back transformer is discarded, any problem of environmental pollution is difficult to occur.

According to the present invention, a fly-back transformer having these advantages can be produced efficiently.

The flame-retardant epoxy resin compositions according to the present invention have advantages in that (1) they have a lower viscosity and therefore show a longer pot life and better workability on casting as compared with prior art flame-retardant epoxy resin compositions and (2) they are superior in operational safety to the prior art compositions.

Also, if necessary, a coloring agent such as titanium white or red iron oxide, a silane coupling agent, a titanate coupling agent, a silicone defoaming agent, etc. may be added to the flame-retardant epoxy resin compositions according to the present invention. Even if these auxiliary materials are added, the properties of the fly-back transformer are not deteriorated. As the silane coupling agent, for example, γ-glycidoxypropyltrimethoxysilane may be used. It is preferably used in an amount of 0.3 to 2.5 parts by weight, and desirably 0.5 to 1.0 part by weight, per 100 parts by weight of the polyepoxide. If the amount added is less than 0.3 part by weight, the adhesiveness improving effect of the silane coupling agent can not be displayed. Also, the amount added is more than 2.5 parts by weight, the thermo-setting property and the glass transmission temperature after curing of the resin composition are remarkably reduced.

EXAMPLE 1

Figure 1:
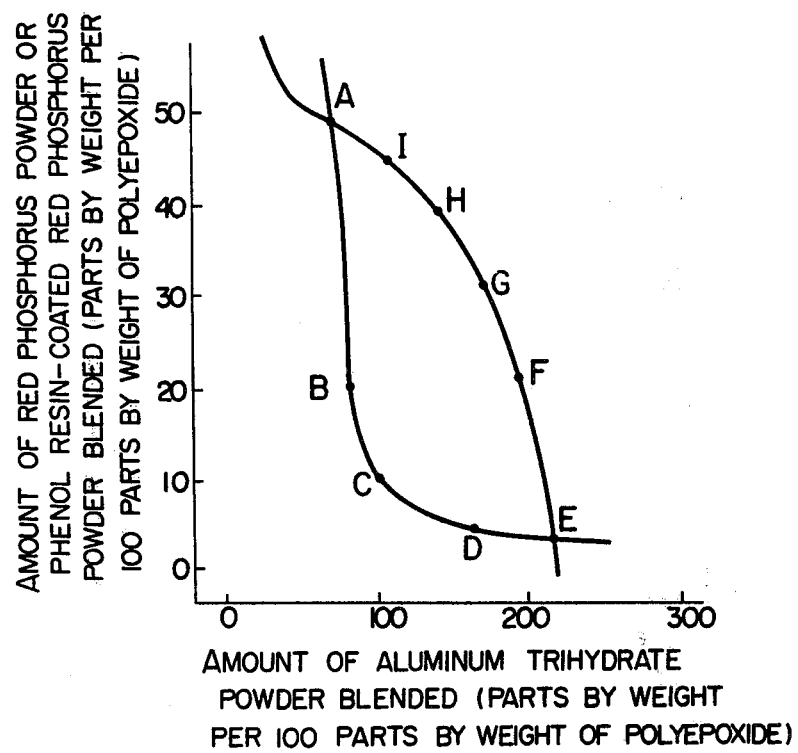
FIG. 1 shows the amount of at least one member selected from the group consisting of red phosphorus powder and thermo-setting resin-coated red phosphorus powder and the amount of aluminum trihydrate powder respectively added to a polyepoxide.
Figure 2:
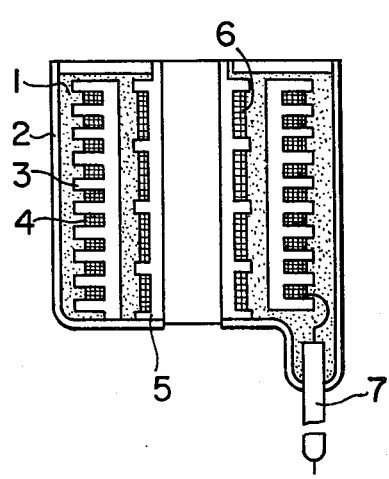
FIG. 2 is a sectional view of a fly-back transformer.

Flame-retardant epoxy resin compositions having the compositions as shown in the "Composition" row of Table 1 were respectively poured into the coil portion of a fly-back transformer as shown in FIG. 2 from above at a temperature of 20° to 30° C. and a pressure of 2 to 4 mmHg and then heated at 60° C. for 4 hours and at 105° C. for 7 hours to obtain a flame-retardant epoxy resin composition cast fly-back transformer.

Table 1

| Materials, property, etc. | | | Sample No. | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Composition (parts by weight) | Polyepoxide | Diglycidyl ether of bisphenol A | 100 | 100 | — | — | 100 | 100 | 100 | 100 | 100 | 100 | 100 | 100 | 100 |
| | | Diglycidyl ester of tetrahydrophthalic acid | — | — | 100 | 100 | — | — | — | — | — | — | — | — | — |
| | Anhydride curing agent | methyltetrahydrophthalic anhydride | 80 | — | 90 | — | — | — | — | — | — | — | — | 80 | — |
| | | Methylenedomethylenetetrahydrophthalic anhydride | — | 80 | — | 90 | 80 | 80 | 80 | 80 | 80 | 80 | 80 | — | 80 |
| | Accelerator | 2-Ethyl-4-methylimidazole | 1.0 | 1.0 | 1.0 | 1.0 | 1.0 | 1.0 | 1.0 | 1.0 | 1.0 | 1.0 | 1.0 | 1.0 | 1.0 |
| | Flame retardant, filler | Aluminum trihydrate powder (average particle size 8 μ) | 120 | 120 | 160 | 140 | 72 | 83 | 103 | 220 | 198 | 178 | 154 | 120 | 154 |
| | | Red phosphorus powder (average particle size 6 μ) | 20 | 20 | 15 | 15 | 50 | 20 | 10 | 4 | 20 | 31 | 40 | 20 | 40 |
| | Silane coupling agent | γ-Glycidoxypropyltrimethoxysilane | — | — | — | — | — | — | — | — | — | — | — | 1.0 | 1.0 |
| Viscosity of resin composition at 25° C. (poise) | | | 44 | 33 | 34 | 30 | 22 | 24 | 25 | 67 | 72 | 67 | 43 | 44 | 43 |
| Conditions for producing fly-back transformer | Conditions for pouring resin composition<br>Curing conditions | | Temperature: 20–30° C.<br>Pressure: 2–4 mmHg<br>60° C./4 hour + 105° C./7 hour | | | | | | | | | | | | |

FIG. 2 is a cross sectional view of the fly-back transformer thus obtained. The fly-back transformer can be produced by installing a primary bobbin (5), a secondary bobbin (3), a primary coil (6) and a secondary coil (4) in a case (2), drawing a high voltage lead wire (7) out of the secondary coil (4), and then pouring a resin solution (1) for impregnation and coating.

Figure 3:
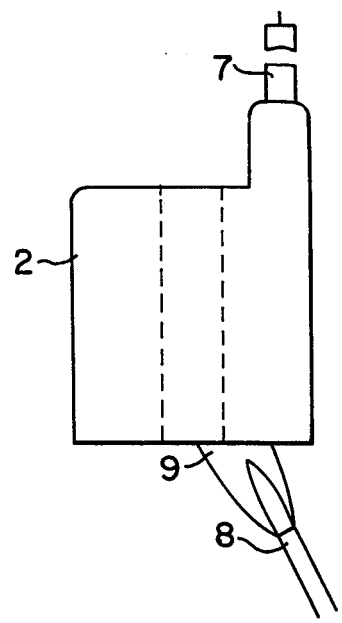
FIG. 3 is a schematic representation showing a test method for the flame-retardancy of a fly-back transformer.

As shown in FIG. 3, the bottom of the case (2) of the respective flame-retardant epoxy resin composition cast fly-back transformers thus obtained was exposed to the oxidizing flame (9) of a gas burner (8) to carry out a flame retardancy test (Electric Appliance Control Regulation in Japan). As a result, all of the fly-back transformers passed the test and the amount of smoke on burning was all small as shown in the "Properties of fly-back transformer" row of Table 2.

Therefter, the flame-retardant epoxy resin composition cast fly-back transformers were respectively cut as shown in FIG. 2 and the impregnation of the secondary coil with the flame-retardant epoxy resin composition and the presence or absence of voids in the coils were observed. As a result, the impregnation was good and no void existed as shown in the "Properties of fly-back transformer" row of Table 2.

Table 2

| Properties, etc. | Sample No. | | | | | | |
|---|---|---|---|---|---|---|---|
| | 1 | 2 | 3 | 4 | 5 | 6 | 7 |
| Dispersibility of flame retardant and filler (microscopic observa- | Good | Good | Good | Good | Good | Good | Good |

|  | Properties, etc. | 1 | 2 | 3 | 4 | 5 | 6 | 7 |
|---|---|---|---|---|---|---|---|---|
| | Dispersibility of flame retardant and filler (microscopic observation of dispersibility when stirred by a labo stirrer for 30 minutes) | | | | | | | |
| | Amount of phosphine gas generated ($10^{-6}$ ml per transformer) (the amount generated on curing of the resin, measured by gas chromatography) | 25 | 22 | 21 | 21 | 30 | 26 | 22 |
| Properties of resin composition | Flame retardancy UL94 (thickness 1/16 inch) | V-0 | V-0 | V-0 | V-0 | V-0 | V-0 | V-0 |
| | Tracking resistance* [C.T.I] (volts) | 600 | 600 | 600 | 600 | 600 | 600 | 600 |
| | Arc resistance** (seconds) | 160 | 140 | 180 | 140 | 120 | 120 | 140 |
| Properties of fly-back transformer | Flame retardancy (Electric Appliance Control Regulation in Japan) | Passed | Passed | Passed | Passed | Passed | Passed | Passed |
| | Amount of smoke generated on burning | Small | Small | Small | Small | Small | Small | Small |
| | Impregnation*** | O | O | O | O | O | O | O |
| Properties of fly-back transformer | Presence of voids in coils**** | O | O | O | O | O | O | O |
| | High voltage***** regulation (kV) 60° C. after standing at 95% RH for 1000 hours | 1.8 | 1.8 | 1.8 | 1.9 | 2.0 | 1.7 | 1.9 |

|  | Properties, etc. | Sample No. | | | | | |
|---|---|---|---|---|---|---|---|
|  |  | 8 | 9 | 10 | 11 | 12 | 13 |
| | Dispersibility of flame retardant and filler (microscopic observation of dispersibility when stirred by a labo stirrer for 30 minutes) | Good | Good | Good | Good | Good | Good |
| | Amount of phosphine gas generated ($10^{-6}$ ml per transformer) (the amount generated on curing of the resin, measured by gas chromatography) | 14 | 22 | 30 | 33 | 25 | 33 |
| Properties of resin composition | Flame retardancy UL94 (thickness 1/16 inch) | V-0 | V-0 | V-0 | V-0 | V-0 | V-0 |
| | Tracking resistance* [C.T.I] (volts) | 600 | 600 | 600 | 600 | 600 | 600 |
| | Arc resistance** (seconds) | 180 | 180 | 160 | 160 | 160 | 160 |
| Properties of fly-back transformer | Flame retardancy (Electric Appliance Control Regulation in Japan) | Passed | Passed | Passed | Passed | Passed | Passed |
| | Amount of smoke generated on burning | Small | Small | Small | Small | Small | Small |
| | Impregnation*** | O | O | O | O | O | O |
| Properties of fly-back transformer | Presence of voids in coils**** | O | O | O | O | O | O |
| | High voltage***** regulation (kV) 60° C. after standing at 95% RH for 1000 hours | 1.8 | 2.0 | 1.9 | 1.7 | 1.4 | 1.4 |

*IEC publication 112
**JIS K-6911
***The coils were cut and observed microscopically.
O: Good  X : Poor
****The coils were cut and observed microscropically.
O : Not existed  X : Existed
*****A change in output voltage when a beam current was changed.

Further, the fly-back transformers were allowed to stand at a high temperature (60° C.) and a high humidity (95% RH) for 1000 hours and then operated. High voltage regulation was measured by varying a beam current. As a result, it was found that the high voltage regulation was good and showed almost no change as compared with the initial values in all cases as shown in the "Properties of fly-back transformer" row of Table 2. (The initial values for the cast fly-back transformers were all 1.5 kV.)

Also, the dispersibility of flame retardant and filler which is important in the preparation of flame-retardant epoxy resin compositions was very good in all cases as is clear from the "Dispersibility of flame retardant and filler" row of Table 2. Therefore, special mixing means such as roller kneading were not required. Further, the amount of the phosphine gas generated on curing of the fly-back transformers was measured by gas chromatography. As a result, it was found that the amount of the said harmful gas generated was very small and caused no trouble with regard to safety as shown in the "Amount of phosphine gas generated per transformer" row of Table 2. Further, the flame-retardant epoxy resin compositions having the compositions as shown in the "Composition" row of Table 2 were cured at 60° C. for 4 hours and at 105° C. for 7 hours and the flame retardancy, tracking resistance and arc resistance of the resin compositions were examined. As a result, it was found that flame retardancy was V-0, tracking resistance was 600 volts and arc resistance was 120 to 180 seconds.

The fly-back transformers produced by the casting of these flame-retardant epoxy resin compositions not only operated properly but also maintained their good properties for a long period of time even if they were operated at a severe temperature.

The flame-retardant epoxy resin compositions (samples Nos. 12 and 13) containing a silane coupling agent show good hygroscopicity and, for example, are superior in high voltage regulation to the resin compositions (samples Nos. 1 to 11) containing no silane coupling agent.

Although not described in the example, it is possible to blend various additives such as a defoaming agent, a voltage stabilizer, a coloring agent, a surfactant, etc. into the resin compositions. Also, the flame-retardant epoxy resin compositions according to the present invention are also applicable to systems for a fly-back transformer other than the system as shown in FIG. 2 such as fly-back transformers of a plastic film-layer insulation system, small multi-purpose fly-back transformers wherein diodes, resistors, capacitors, etc. are installed, fly-back transformers wherein a case is replaced by a metal mold, insulated fly-back transformers of a dip coat system, etc.

EXAMPLE 2

Figure 4:
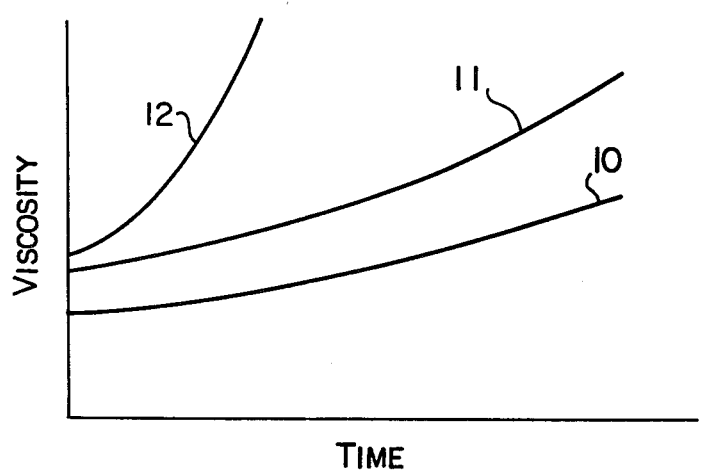
FIG. 4 shows a change in the viscosity of a flame-retardant epoxy resin composition.

Cast fly-back transformer as shown in FIG. 2 were produced with flame-retardant epoxy resin compositions having the compositions as shown in the "Composition" row of Table 3 in the same manner as in Example 1. With regard to the fly-back transformers thus obtained, various tests were carried out in the same manner as in Example 1. The results obtained are shown in Table 4. Also, the flame-retardant epoxy resin compositions having the compositions Nos. 1-11 in Table 3 show an initial viscosity and a change in viscosity during standing as shown by curve (10) in FIG. 4. Also, the flame-retardant epoxy resin compositions having the compositions Nos. 1-11 in Table 1 show an initial viscosity and a change in viscosity during standing as shown by curve (11) in FIG. 4. Thus, the flame-retardant epoxy resin compositions in Table 3 are all superior in initial viscosity and a change in viscosity with the lapse of time to the corresponding flame-retardant epoxy resin compositions in Table 1. Therefore, the resin compositions in Table 3 have a longer pot life and better workability on casting as compared with the resin compositions in Table 1.

The flame-retardant epoxy resin compositions (samples Nos. 12 and 13 in Table 3) containing a silane coupling agent show good hygroscopicity and, for example, are superior in high voltage regulation to the resin compositions (samples Nos. 1 to 11 in Table 3) containing no coupling agent.

Table 3

| Materials, property, etc. | | | Sample No. | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Composition (parts by weight) | Polyepoxide | Diglycidyl ether of bisphenol A | 100 | 100 | — | — | 100 | 100 | 100 | 100 | 100 | 100 | 100 | 100 | 100 |
| | | Diglycidyl ester of tetrahydrophthalic acid | — | — | 100 | 100 | — | — | — | — | — | — | — | — | — |
| | Anhydride curing agent | Methyltetrahydrophthalic anhydride | 80 | — | 90 | — | — | — | — | — | — | — | — | 80 | — |
| | | Methylendomethylenetetrahydrophthalic anhydride | — | 80 | — | 90 | 80 | 80 | 80 | 80 | 80 | 80 | 80 | — | 80 |
| | Accelerator | 2-Ethyl-4-methylimidazole | 1.0 | 1.0 | 1.0 | 1.0 | 1.0 | 1.0 | 1.0 | 1.0 | 1.0 | 1.0 | 1.0 | 1.0 | 1.0 |
| | Flame retardant, filler | Aluminum trihydrate powder (average particle size 8 μ) | 120 | 120 | 160 | 140 | 72 | 83 | 103 | 220 | 198 | 178 | 154 | 120 | 154 |
| | | Phenol resin-coated red phosphorus powder (average particle size 6 μ) | 20 | 20 | 15 | 15 | 50 | 20 | 10 | 4 | 20 | 31 | 40 | 20 | 40 |
| | Silane coupling agent | γ-Glycidoxypropyltrimethoxysilane | — | — | — | — | — | — | — | — | — | — | — | 1.0 | 1.0 |
| | Viscosity of resin composition at 25° C. (poise) | | 36 | 27 | 28 | 25 | 18 | 20 | 21 | 55 | 60 | 55 | 35 | 36 | 35 |
| Conditions for producing flyback transformer | Conditions for pouring resin composition | | Temperature: 20-30° C. Pressure: 2-4 mmHg | | | | | | | | | | | | |
| | Curing conditions | | 60° C./4 hours + 105° C./7 hours | | | | | | | | | | | | |

Table 4

| Properties, etc. | Sample No. 1 | 2 | 3 | 4 | 5 | 6 | 7 | 8 | 9 | 10 | 11 | 12 | 13 |
|---|---|---|---|---|---|---|---|---|---|---|---|---|---|
| Dispersibility of flame retardant and filler (microscopic observation of dispersibility when stirred by a labo stirrer for 30 minutes) | Good | Good | Good | Good | Good | Good | Good | Good | Good | Good | Good | Good | Good |
| Amount of phosphine gas generated ($10^{-8}$ ml per transformer) (the amount generated on curing of the resin, measured by gas chromatography) | 23 | 20 | 18 | 19 | 28 | 24 | 20 | 12 | 21 | 29 | 32 | 23 | 32 |
| Properties of resin composition — Flame retardancy UL94 (thickness 1/16 inch) | V-0 | V-0 | V-0 | V-0 | V-0 | V-0 | V-0 | V-0 | V-0 | V-0 | V-0 | V-0 | V-0 |
| Tracking resistance* [C.T.I.] (volts) | 600 | 600 | 600 | 600 | 600 | 600 | 600 | 600 | 600 | 600 | 600 | 600 | 600 |
| Arc resistance** (seconds) | 160 | 140 | 180 | 140 | 120 | 120 | 140 | 180 | 180 | 160 | 160 | 160 | 160 |
| Properties of fly-back transformer — Flame retardancy (Electric Appliance Control Regulation in Japan) | Passed | Passed | Passed | Passed | Passed | Passed | Passed | Passed | Passed | Passed | Passed | Passed | Passed |
| Amount of smoke generated on burning | Small | Small | Small | Small | Small | Small | Small | Small | Small | Small | Small | Small | Small |
| Impregnation*** | O | O | O | O | O | O | O | O | O | O | O | O | O |
| Presence of voids in coils**** | O | O | O | O | O | O | O | O | O | O | O | O | O |
| Properties of fly-back transformer — High voltage***** regulation (kV) 60° C, after standing at 95% RH for 1000 hours | 1.8 | 1.8 | 1.8 | 1.9 | 1.9 | 1.9 | 1.8 | 1.9 | 1.9 | 2.0 | 1.9 | 1.5 | 1.4 |

| Properties, etc. | Sample No. 14 | 15 | 16 | 17 | 18 | 19 | 20 | 21 | 22 | 23 | 24 |
|---|---|---|---|---|---|---|---|---|---|---|---|
| Dispersibility of flame retardant and filler (microscopic observation of dispersibility when stirred by a labo stirrer for 30 minutes) | Good | Good | Good | Good | Good | Good | Good | Good | Good | Poor | Good |
| Amount of phosphine gas generated ($10^{-8}$ ml per transformer) (the amount generated on curing of the resin, measured by gas chromatography) | 16 | 0 | 30 | 35 | 8 | 28 | 18 | 33 | 18 | 0 | 26 |
| Properties of resin composition — Flame retardancy UL94 (thickness 1/16 inch) | V-1 | V-0 | V-0 | V-0 | V-2 | V-2 | V-1 | V-0 | V-0 | V-0 | V-0 |
| Tracking resistance* [C.T.I.] (volts) | 300 | 600 | 600 | 600 | 250 | 250 | 600 | 600 | 600 | 600 | 600 |
| Arc resistance** (seconds) | 100 | 180 | 190 | 160 | 80 | 90 | 100 | 150 | 200 | 130 | 130 |
| Properties of fly-back transformer — Flame retardancy (Electric Appliance Control Regulation in Japan) | Rejected | Passed | Passed | Passed | Rejected | Rejected | Rejected | Passed | Passed | Passed | Passed |

Table 4-continued

| Properties of fly-back transformer | Amount of smoke generated on burning | Medium | Small | Small | Small | Medium | Medium | Medium | Small | Small | Small | Large | Small |
|---|---|---|---|---|---|---|---|---|---|---|---|---|---|
| | Impregnation*** | ○ | × | × | × | ○ | ○ | ○ | ○ | × | × | ○ | × |
| | Presence of voids in coils**** | ○ | × | × | × | ○ | ○ | ○ | ○ | × | × | ○ | × |
| | High voltage***** regulation (kV) 60° C, after standing at 95% RH for 1000 hours | 1.9 | 1.9 | 2.1 | 1.7 | 1.9 | 2.0 | 1.7 | 2.1 | 2.3 | 2.0 | 6.1 | |

*IEC publication 112
**JIS K-6911
***The coils were cut and observed microscopically.
○ : Good  × : Poor
****The coils were cut and observed microscopically.
○ : Not existed  × : existed
*****A change in output voltage when a beam current was changed.

COMPARATIVE EXAMPLE

The composition, etc. of epoxy resin compositions as comparative example are shown in Table 5 and their properties are shown in samples Nos. 14–24 of Table 4. The fly-back transformers produced by the casting of the epoxy resin compositions Nos. 4, 18 and 19 in Table 5 were unsatisfactory in flame retardancy since the amounts of phenol resin coated red phosphorus powder and aluminum trihydrate powder were small. Also, the fly-back transformers produced by the casting of the epoxy resin compositions Nos. 15, 16 and 17 were satisfactory in flame retardancy since phenol resin-coated red phosphorus powder and aluminum trihydrate powder were blended in a large amount. (See Table 4, the "Properties of fly-back transformer" row, Nos. 14–19.) However, the resin compositions Nos. 15, 16 and 17 showed poor fluidity and caused entrainment of air on pouring. Since the entrained air was difficult to detrain, voids remained in the coils as shown in the "Properties of fly-back transformer" row of Table 4. Thus, no fly-back transformer having a long life was able to be obtained.

Table 5

| Materials property, etc. | | | Sample No. 14 | 15 | 16 | 17 | 18 | 19 | 20 | 21 | 22 | 23 | 24 |
|---|---|---|---|---|---|---|---|---|---|---|---|---|---|
| Composition (parts by weight) | Polyepoxide | Diglycidyl ether of bisphenol A | 100 | 100 | 100 | 100 | 100 | 100 | 100 | 100 | 100 | 100 | 100 |
| | Anhydride curing agent | Methyltetrahydro-phthalic anhydride | 80 | 80 | 80 | 80 | 80 | 80 | 80 | 80 | 80 | 80 | — |
| | Amine curing agent | Bis(3-methyl-4-aminocyclohexyl)-methane | — | — | — | — | — | — | — | — | — | — | 30 |
| | Accelerator | 2-Ethyl-4-methyl-imidazole | 1 | 1 | 1 | 1 | 1 | 1 | 1 | 1 | 1 | 1 | — |
| | Flame retardant, filler | Aluminum trihydrate powder (average particle size 8 μ) | 80 | 250 | 200 | 150 | 60 | 60 | 90 | 130 | 230 | 120 | 120 |
| | | Phenol resin-coated red phosphorus powder (average particle size 6 μ) | 10 | — | 30 | 50 | 6 | 40 | — | — | — | — | 20 |
| | | Red phosphorus power (average particle size 6 μ) | — | — | — | — | — | — | 10 | 50 | 10 | — | — |
| | | Hexabromobenzene | — | — | — | — | — | — | — | — | — | 30 | — |
| | | Antimony trioxide | — | — | — | — | — | — | — | — | — | 15 | — |
| Viscosity of resin composition at 25° C. (poise) | | | 17 | 80 | 80 | 55 | 22 | 20 | 25 | 45 | 75 | 38 | 60 |
| Conditions for producing fly-back transformer | Conditions for pouring resin composition | | Temperature: 20–30° C. Pressure: 2–4 mmHg | | | | | | | | | | |
| | Curing conditions | | 60° C./4 hours + 105° C./7 hours | | | | | | | | | | |

The epoxy resin composition having the composition No. 20 in Table 5 was rejected in the flame retardancy test since the contents of red phosphorus powder and aluminum trihydrate powder were low. Also, epoxy resin compositions having the compositions Nos. 21 and 22 in Table 5 showed poor impregnation and the formation of voids in coils since the total amount of red phosphorus and aluminum trihydrate powder was large. (Table 4, Nos. 20, 21 and 22)

In the epoxy resin composition as shown in the "Composition" row of Table 5, No. 23, flame retardancy is afforded by blending a halogenated organic compound flame retardant and antimony trioxide. The resin composition was not practically preferable in that a large amount of black smoke and harmful gases are generated on burning as shown in the "Amount of smoke generated on burning" row of Table 4. Also, the epoxy resin composition No. 24 in Table 5, which is an example wherein an amine curing agent is used, had defects in that the impregnating property of the fly-back transformer as produced with the resin composition was poor and voids were formed in coils as shown in the "Properties of fly-back transformer" row of Table 4. Also, the epoxy resin composition No. 24 in Table 5 shows an initial viscosity and a change in viscosity during standing as shown by curve 12 in FIG. 4. Further, when the fly-back transformer produced with the epoxy composition was allowed to stand at a high temperature and a high humidity, it showed a variation in high voltage regulation.

As described above, the insulation treatment of fly-back transformer coils with the flame-retardant epoxy resin compositions according to the present invention has the following advantages:

(a) Fine gaps in the coil portion of the fly-back transformer can satisfactorily be impregnated with the resin, and thereby partial discharge is difficult to occur as compared with prior art resin compositions.

(b) The pot life of the resin is prolonged and thereby workability on the insulation treatment of the fly-back transformer is improved.

(c) The fly-back transformer insulated with the said flame-retardant epoxy resin compositions can pass a flame retardancy test (Electric Appliance Control Regulation in Japan).

Additionally, the fly-back transformer insulated with the flame-retardant epoxy resin compositions according to the present invention has an excellent characteristic that its output voltage is stable.

What is claimed is:

1. A flame-retardant epoxy resin composition comprising 100 parts by weight of a polyepoxide containing more than one epoxy group in its molecule, 0.8 to 1.2 equivalents of an acid anhydride curing agent per equivalent of the polyepoxide, 0.5 to 5 parts by weight of an imidazole curing agent per 100 parts by weight of said polyepoxide, and amounts of aluminum trihydrate powder and at least one member selected from the group consisting of red phosphorus powder and red phosphorus powder coated by a thermo-setting resin within the range surrounded by connecting the points A, B, C, D, E, F, G, H and I as described below per 100 parts by weight of said polyepoxide, wherein the points A, B, C, D, E, F, G, H and I each represent the following compositions:

|   | Aluminum trihydrate powder (parts by weight) | Red phosphorus powder or red phosphorus powder coated by a thermo-setting resin (parts by weight) |
|---|---|---|
| A | 72 | 50 |
| B | 83 | 20 |
| C | 103 | 10 |
| D | 160 | 5 |
| E | 220 | 4 |
| F | 198 | 20 |
| G | 178 | 31 |
| H | 154 | 40 |
| I | 112 | 46 |

2. A flame-retardant epoxy resin composition according to claim 1, wherein said polyepoxide containing more than one epoxy group in its molecule is at least one polyepoxide selected from the group consisting of diglycidyl ether of bisphenol A, diglycidyl ether of bisphenol F, polyglycidyl esters of polycarboxylic acids and epoxidized cyclohexene derivatives, said acid anhydride curing agent is at least one acid anhydride selected from the group consisting of methyltetrahydrophthalic anhydride, methylendomethylenetetrahydrophthalic anhydride and modified hexahydrophthalic anhydrides, said imidazole curing accelerator is at least one imidazole compound selected from the group consisting of 2-ethyl-4-methylimidazole, 2-phenylimidazole, 2-methylimidazole, 1-benzyl-2-methylimidazole and 1,2-dimethylimidazole, said aluminum trihydrate powder has an average particle size of 1 to 20μ, and said red phosphorus powder or red phosphorus powder coated by a thermo-setting resin has an average particle size of 4 to 20μ.

3. A flame-retardant epoxy resin composition according to claim 1, wherein said polyepoxide containing more than one epoxy group in its molecule is a mixture of diglycidyl ether of bisphenol A and diglycidyl tetrahydrophthalate, said acid anhydride curing agent is a mixture of methyltetrahydrophthalic anhydride and methylendomethylenetetrahydrophthalic anhydride, said imidazole curing accelerator is 2-ethyl-4-methylimidazole, said aluminum trihydrate powder has an average particle size of 8μ, and said red phosphorus powder or red phosphorus powder coated by a thermo-setting resin has an average particle size of 6μ.

4. A flame-retardant epoxy resin composition according to claim 1, wherein 0.3 to 2.5 parts by weight of a silane coupling agent is added to 100 parts by weight of a polyepoxide in the resin composition.

5. A flame-retardant epoxy resin composition according to claim 4, wherein said silane coupling agent is γ-glycidoxypropyltrimethoxysilane.

6. A flame-retardant epoxy resin composition according to claim 2, wherein 0.3 to 2.5 parts by weight of γ-glycidoxypropyltrimethoxysilane is added to 100 parts by weight of a polyepoxide in the resin composition.

7. A flame-retardant epoxy resin composition according to claim 3, wherein 0.3 to 2.5 parts by weight of γ-glycidoxypropyltrimethoxysilane is added to 100 parts by weight of a polyepoxide in the resin composition.

8. A flame-retardant epoxy resin composition comprising 100 parts by weight of a polyepoxide containing more than one epoxy group in its molecule, 0.8 to 1.2 equivalents of an acid anhydride curing agent per equivalent of the polyepoxide, 0.5 to 5 parts by weight of an imidazole curing agent per 100 parts by weight of said polyepoxide, and amounts of aluminum trihydrate powder and red phosphorus powder coated by a thermo-setting resin within the range surrounded by connecting the points A, B, C, D, E, F, G, H and I as described blow per 100 parts by weight of said polyepoxide, wherein the points A, B, C, D, E, F, G, H and I each represent the following compositions:

|   | Aluminum trihydrate powder (parts by weight) | Red phosphorus powder coated by a thermo-setting resin (parts by weight) |
|---|---|---|
| A | 72 | 50 |
| B | 83 | 20 |
| C | 103 | 10 |
| D | 160 | 5 |
| E | 220 | 4 |
| F | 198 | 20 |
| G | 178 | 31 |
| H | 154 | 40 |
| I | 112 | 46 |

9. A flame-retardant epoxy resin composition according to claim 8, wherein said polyepoxide containing more than one epoxy group in its molecule is at least one polyepoxide selected from the group consisting of diglycidyl ether of bisphenol A, diglycidyl ether of bisphenol F, polyglycidyl esters of polycarboxylic acids and epoxidized cyclohexene derivatives, said acid anhydride curing agent is at least one acid anhydride selected from the group consisting of methyltetrahydrophthalic anhydride, methylendomethylenetetrahydrophthalic anhydride and modified hexahydrophthalic anhydrides, said imidazole curing accelerator is at least one imidazole compound selected from the group consisting of 2-ethyl-4-methylimidazole, 2-phenylimidazole, 2-methylimidazole, 1-benzyl-2-methylimidazole and 1,2-dimethylimidazole, said aluminum trihydrate powder has an average particle size of 1 to 20μ, and said red phosphorus powder coated by a thermo-setting resin has an average particle size of 4 to 20μ.

10. A flame-retardant epoxy resin composition according to claim 8, wherein said polyepoxide containing not more than one epoxy group in its molecule is a mixture of diglycidyl ether of bisphenol A and diglycidyl tetrahydrophthalate, said acid anhydride curing agent is a mixture of methyltetrahydrophthalic anhydride and methylendomethylenetetrahydrophthalic anhydride, said imidazole curing accelerator is 2-ethyl-4-methylimidazole, said aluminum trihydrate powder has an average particle size of 8μ, and said red phosphorus powder coated by a thermo-setting resin has an average particle size of 6μ.

11. A flame-retardant epoxy resin composition according to claim 8, wherein 0.3 to 2.5 parts by weight of a silane coupling agent is added to 100 parts by weight of a polyepoxide in the resin composition.

12. A flame-retardant epoxy resin composition according to claim 11, wherein said silane coupling agent is γ-glycidoxypropyltrimethoxysilane.

13. A flame-retardant epoxy resin composition according to claim 9, wherein 0.3 to 2.5 parts by weight of γ-glycidoxypropyltrimethoxysilane is added to 100 parts by weight of a polyepoxide in the resin composition.

14. A flame-retardant epoxy resin composition according to claim 10, wherein 0.3 to 2.5 parts by weight of γ-glycidoxypropyltrimethoxysilane is added to 100 parts by weight of a polyepoxide in the resin composition.

15. A flame-retardant epoxy resin composition according to claim 1, wherein said at least one member is red phosphorus powder.

16. A flame-retardant epoxy resin composition according to claim 15, wherein said polyepoxide containing more than one epoxy group in its molecule is at least one polyepoxide selected from the group consisting of diglycidyl ether of bisphenol A, diglycidyl ether of bisphenol F, polyglycidyl esters of polycarboxylic acids and epoxidized cyclohexene derivatives, said acid anhydride curing agent is at least one acid anhydride selected from the group consisting of methyltetrahydrophthalic anhydride, methylendomethylene-tetrahydrophthalic anhydride and modified hexahydrophthalic anhydrides, said imidazole curing accelerator is at least one imidazole compound selected from the group consisting of 2-ethyl-4-methylimidazole, 2-phenylimidazole, 2-methylimidazole, 1-benzyl-2-methylimidazole and 1,2-dimethylimidazole, said aluminum trihydrate powder has an average particle size of 1 to 20μ, and said red phosphorus powder has an average particle size of 4 to 20μ.

17. A flame-retardant epoxy resin composition according to claim 15, wherein said polyepoxide containing more than one epoxy group in its molecule is a mixture of diglycidyl ether of bisphenol A and diglycidyl tetrahydrophthalate, said acid anhydride curing agent is a mixture of methyltetrahydrophthalic anhydride and methylendomethylenetetrahydrophthalic anhydride, said imidazole curing accelerator is 2-ethyl-4-methylimidazole, said aluminum trihydrate powder has an average particle size of 8μ, and said red phosphorus powder has an average particle size of 6μ.

18. A flame-retardant epoxy resin composition according to claim 15, wherein 0.3 to 2.5 parts by weight of a silane coupling agent is added to 100 parts by weight of a polyepoxide in the resin composition.

19. A flame-retardant epoxy resin composition according to claim 18, wherein said silane coupling agent is γ-glycidoxypropyltrimethoxysilane.

20. A flame-retardant epoxy resin composition according to claim 16, wherein 0.3 to 2.5 parts by weight of γ-glycidoxypropyltrimethoxysilane is added to 100 parts by weight of a polyepoxide in the resin composition.

21. A flame-retardant epoxy resin composition according to claim 17, wherein 0.3 to 2.5 parts by weight of γ-glycidoxypropyltrimethoxysilane is added to 100 parts by weight of a polyepoxide in the resin composition.

22. A flame-retardant epoxy resin composition according to claim 8, wherein the thermosetting resin is a phenol resin.

* * * * *